US008770616B1

(12) United States Patent  
Draper et al.

(10) Patent No.: US 8,770,616 B1
(45) Date of Patent: Jul. 8, 2014

(54) DEPLOYABLE FOOTREST ASSEMBLY

(71) Applicant: Ford Global Technologies, LLC, Dearborn, MI (US)

(72) Inventors: William Edward Draper, Canton, MI (US); Edward Joseph Leonard Meszaros, Amhesrtburg (CA); Joseph Porcari, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/834,327

(22) Filed: Mar. 15, 2013

(51) Int. Cl.
*B60R 21/16* (2006.01)
(52) U.S. Cl.
USPC .......................................... 280/728.1; 297/75
(58) Field of Classification Search
USPC .................... 297/75, 76; 280/728.1, 728.2
See application file for complete search history.

(56) References Cited

U.S. PATENT DOCUMENTS

| | | | | |
|---|---|---|---|---|
| 2,032,157 | A * | 2/1936 | Dresser et al. | .................. 296/75 |
| 2,862,761 | A | 12/1958 | Scheidegger | |
| 3,059,960 | A * | 10/1962 | Komorowski et al. | .......... 296/64 |
| 6,318,785 | B1 | 11/2001 | Tousignant | |
| 6,502,905 | B2 | 1/2003 | Cheris | |

FOREIGN PATENT DOCUMENTS

| | | |
|---|---|---|
| DE | 3803642 A1 | 10/1988 |
| DE | 19548483 A1 | 6/1997 |
| DE | 19952022 A1 | 5/2001 |
| DE | 102004021362 A1 | 11/2005 |
| DE | 102009046715 A1 | 5/2011 |
| JP | 2005145183 A * | 6/2005 |
| JP | 2008189030 A * | 8/2008 |

OTHER PUBLICATIONS

Website printout from www.quadratec.com as found at http://www.quadratec.com/products/12590_1100.htm entitled "M.O.R.E. Drivers Side Dead Pedal." Author: Quadratec, Inc., published Dec. 9, 2011 in the United States.

* cited by examiner

*Primary Examiner* — Faye M. Fleming
(74) *Attorney, Agent, or Firm* — Vichit Chea; Price Heneveld LLP (57) ABSTRACT

A deployable footrest assembly includes a top plate that is actuated by an actuator such that the top plate is operable between stowed and deployed positions. During deployment, the top plate is released from a housing by moving a latch mechanism to an unlatched position. Once the top plate is released from the housing, the actuator provides an in-line assist feature to linkage arms of a linkage assembly. Powered by the actuator, the linkage arms rotate to a fixed or set position thereby allowing a vehicle occupant to use the unit as a deployed footrest. During stowage, the latch assembly is coupled to a stowage mechanism, such that when the latch assembly is actuated, the stowage mechanism pulls the linkage arms beyond the set locking threshold angle thereby enabling the top plate to collapse back to a stowed position.

15 Claims, 13 Drawing Sheets

DEPLOYABLE FOOTREST ASSEMBLY

FIELD OF THE INVENTION

The present invention generally relates to a deployable footrest assembly that is used in an occupant compartment of a vehicle interior, and more particularly, to a deployable footrest assembly having a top plate which is pivotally coupled to a housing between deployed and stowed positions, wherein the top plate is supported by a linkage assembly in the deployed position to thereby provide a vehicle occupant with a footrest assembly on demand. Further, the linkage system of the present invention provides adequate support for a robust footrest assembly that is adapted to collapse under a force realized on the top plate, or other occupant related trigger, as imparted by the vehicle occupant which moves the top plate from the deployed position to the stowed position such that the deployable footrest assembly does not fixedly support the top plate in the deployed position, but can selectively collapse during a collision event as a safety feature.

BACKGROUND OF THE INVENTION

Known footrest assemblies generally include a static or fixed position that does not vary according to the vehicle occupant's preference. In an occupant compartment disposed in a vehicle interior, an open floorboard is generally preferred as compared to one constrained by a fixed footrest. Further, a fixed footrest assembly can become impractical when considering the driver's side architecture of a park brake pedal and its execution path.

The present invention provides a deployable footrest which gives vehicle occupants a footrest option based on their reference. Further, the present invention avoids constraints having to deal with a park brake pedal as the present invention is adapted to stow prior to park brake actuation.

SUMMARY OF THE INVENTION

The present invention includes a deployable footrest assembly, wherein a footrest is actuated by way of an actuator which is attached to a top plate that rotates to a deployed position. During deployment, the top plate is released from a housing by moving a latch mechanism to an unlatched position. Once the top plate is released from the housing, the actuator provides an in-line spring assist feature to linkage arms of a linkage assembly. During deployment, the linkage arms rotate to a fixed or set position thereby allowing a vehicle occupant to use the unit as a deployed footrest. During stowage, the latch assembly is coupled to a stowage mechanism, such that when the latch assembly is actuated, a cable pulls the linkage arms beyond a set locking threshold angle thereby enabling the unit to collapse back to a stowed position.

One aspect of the present invention includes a footrest assembly having a top plate which is pivotally coupled to a housing, such that the top plate is moveable between deployed and stowed positions. An actuator is operably coupled to the top plate and adapted to move the top plate to the deployed position when activated by a trigger mechanism. A linkage assembly is adapted to support the top plate in the deployed position. Further, the linkage assembly is adapted to collapse under a load applied by a vehicle occupant to the top plate during a collision event.

Another aspect of the present invention includes a footrest assembly comprising a top plate which is moveable between deployed and stowed positions relative to a housing. A latch mechanism is disposed on the top plate and adapted to retain the top plate in the stowed position when the latch mechanism is in a latched position. An actuator is operably coupled to the top plate and biases the top plate to the deployed position such that the top plate moves to the deployed position when the latch mechanism is in an unlatched position.

Yet another aspect of the present invention includes a footrest assembly having a top plate which is operable between deployed and stowed positions. A linkage assembly is coupled to the top plate and adapted to support the top plate in the deployed position. An actuation mechanism is disposed on the top plate and coupled to a latch mechanism which is adapted to retain the top plate in the stowed position. A stowage mechanism is coupled to the latch mechanism and adapted to move the linkage assembly from a locked condition towards a collapsed condition.

These and other aspects, objects, and features of the present invention will be understood and appreciated by those skilled in the art upon studying the following specification, claims, and appended drawings.

DETAILED DESCRIPTION OF THE PREFERRED EMBODIMENTS

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1A:
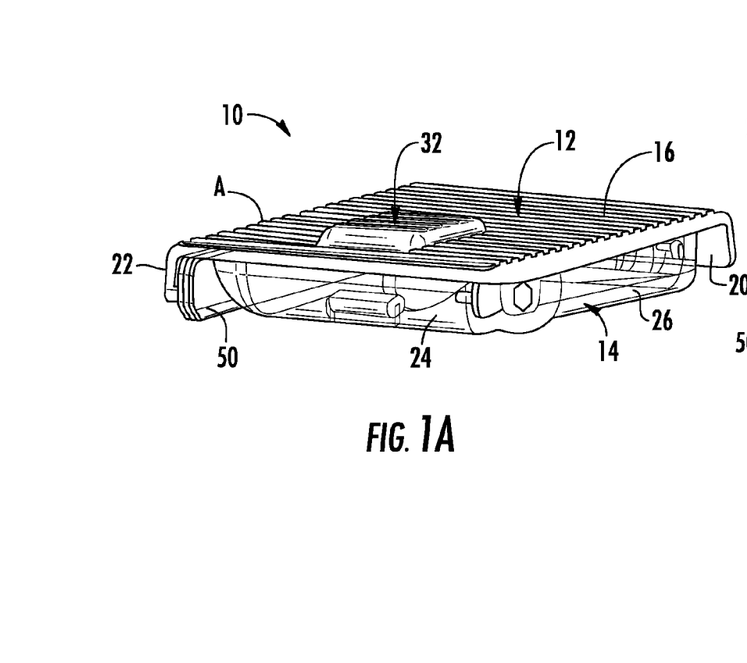
FIG. 1A is a front perspective view of a footrest assembly according to one embodiment in a stowed position.
Figure 1B:
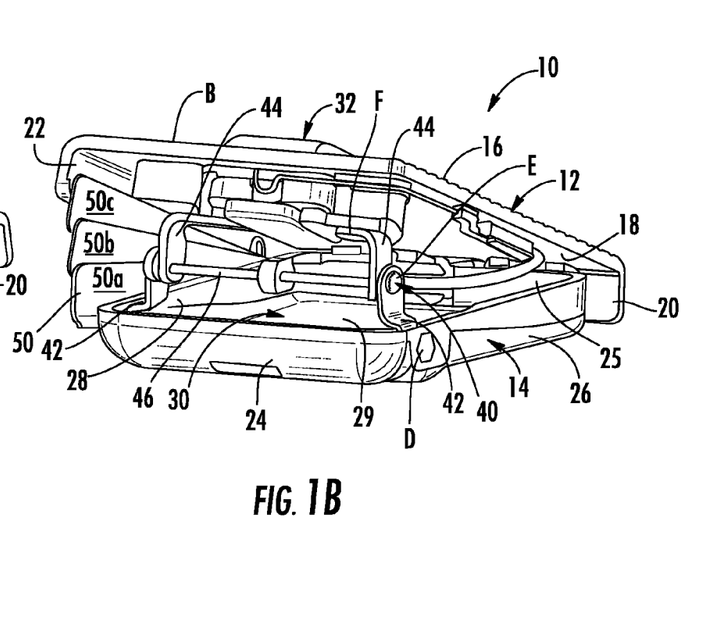
FIG. 1B is a front perspective view of the footrest assembly of FIG. 1A in a deployed position.

Referring to FIGS. 1A and 1B, the reference numeral 10 generally designates a deployable footrest assembly which is adapted to be positioned in a vehicle interior in a vehicle occupant compartment on a floorboard. The footrest assembly 10 includes a top plate 12 which is pivotally coupled to a housing 14 such that the top plate 12 is operable between a stowed position A (FIG. 1A) and a deployed position B (FIG. 1B). The top plate 12 includes an upper surface 16, a lower surface 18 (FIG. 1B), a rear lip 20 and a side lip 22. In this way, the top plate 12 generally defines a cavity in which the housing 14 is disposed. As shown in FIGS. 1A and 1B, the upper surface 16 includes a tread pattern which is adapted to provide a gripping surface for a vehicle occupant when using the footrest assembly 10. The gripping surface can be provided by an adhesive or other like finishing on the upper surface 16 such as a textile adhesive or a molded pattern as shown in FIG. 1A. The top plate 12 also includes an actuation button 32 which is used to deploy and stow the footrest assembly 10 as further described below.

As best shown in FIG. 1B, the housing 14 includes front and rear walls 24, 25 and side walls 26, 28. Together with a bottom surface 29, the housing 14 defines a cavity 30 which is adapted to house componentry that gives the footrest assembly 10 its functionality. As shown in FIG. 1B, the top plate 12 is in a deployed position B which is set at a predetermined angle as determined by a linkage assembly 40. The linkage assembly 40 comprises sets of lower and upper links 42, 44 which are pivotally coupled to one another at a pivot support bar 46. In this way, the lower linkage arms 42 are pivotally coupled to the housing at pivot point D at a lower end and pivotally coupled to the upper links 44 at a pivot point E. The upper arms 44 are further coupled to the top plate 12 at a pivot point F at an upper end, such that the linkage assembly 40 supports the top plate 12 in the deployed position B. In this way, the linkage assembly 40 includes an upper pivot point E and a lower pivot point D. Thus, the linkage assembly 40 is disposed between and operably coupled to the housing 14 and the top plate 12, and moveable between an extended position, shown in FIG. 1B, and a collapsed position, shown in FIG. 12. As shown in FIGS. 1A and 1B, the footrest assembly 10 further comprises a side closeout mechanism 50 having panels 50a, 50b and 50c which are adapted to fan out and provide a guard or closeout mechanism for the footrest assembly 10 in the deployed position B. In assembly, the closeout mechanism 50 protects the componentry used to deploy, support and stow the top plate 12 and is operably coupled to the side lip 22 of the top plate 12 at panel 50c and further coupled to the housing 14 at panel 50a.

Figure 2:
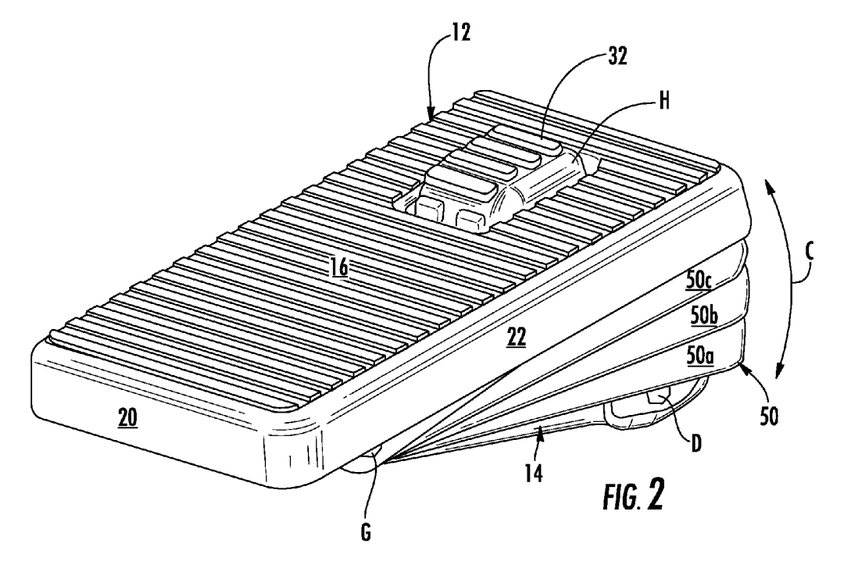
FIG. 2 is a side perspective view of the footrest assembly of FIG. 1B.

Referring now to FIG. 2, the side closeout mechanism 50 is pivotally coupled to the housing 14 at pivot point G which generally comprises a fastener coupled to the housing 14 and panels 50a, 50b and 50c. As shown in FIG. 2, the top plate 12 is in the deployed position B having moved from a stowed position A (FIG. 1A) along a deployment path C. As further shown in FIG. 2, the actuation button 32 is in an at-rest position or a default position H. Thus, the actuation button 32, as shown in FIG. 2, is not being activated by the vehicle occupant and is in the at-rest position or its natural state H which is positioned above the generally planar top surface 16 of top plate 12.

Figure 3:
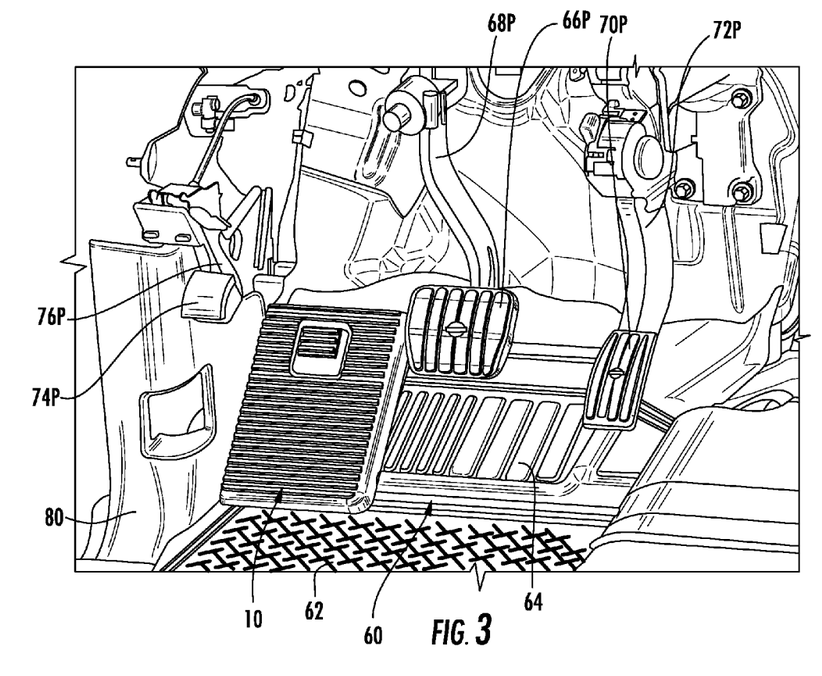
FIG. 3 is a fragmentary perspective view of the footrest assembly of FIG. 1A as shown in a vehicle interior.
Figure 4:
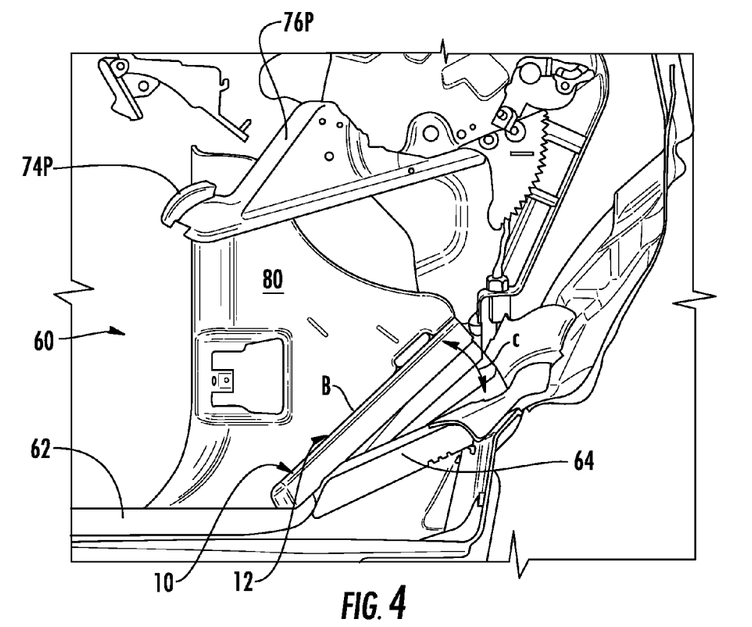
FIG. 4 is a fragmentary side elevational view of the footrest assembly of FIG. 1B as shown in a vehicle interior.
Figure 5:
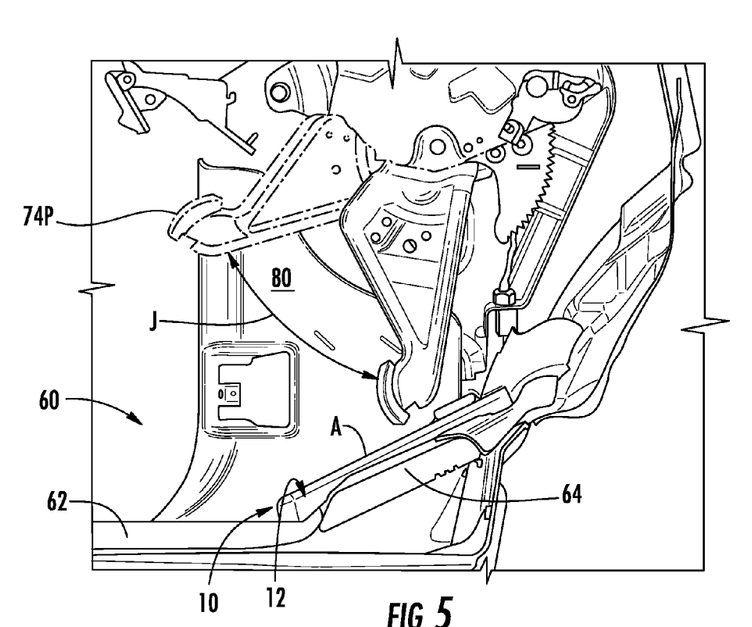
FIG. 5 is a fragmentary side elevational view of the footrest assembly of FIG. 1A as shown in a vehicle interior having a park brake in an actuated position.

Referring now to FIGS. 3-5, the footrest assembly 10 is shown in a vehicle interior 60 having a floorboard comprising a generally planar portion 62 and an angled portion 64. As shown in FIG. 3, the footrest assembly 10 is coupled to the angled portion 64 of the floorboard. As further shown in FIG. 3, the vehicle interior 60 includes a brake pedal 66P having a brake arm 68P and an accelerator pedal 70P having an accelerator arm 72P. The vehicle interior 60 further includes a parking brake assembly 74P having a parking brake arm 76P. Thus, vehicle interiors are generally considered constrained environments with limited available space for a footrest assembly. The footrest assembly 10 is shown adjacent to a cowl trim assembly 80, and given its stowability, the footrest assembly 10 does not interfere with the operation of pedals 66P, 70P and 74P. Thus, the footrest assembly 10 provides a "dead pedal on demand" wherein the footrest assembly 10 is a dead or non-moving footrest assembly in the stowed position A or deployed position B, yet is deployable between these positions. In this way, the present invention provides for a fully modular and deployable footrest assembly 10 giving the vehicle occupant the choice of either deploying or stowing a footrest. In this way, the footrest assembly 10 of the present invention can act as a disappearing footrest assembly for a driver or vehicle occupant who does not desire a footrest. While the footrest assembly 10 is shown disposed in a driver's side compartment, it is contemplated that the footrest assembly can be positioned anywhere in a vehicle interior where a footrest would be desired. Thus, the modularity of the present invention makes for easy installation of a footrest assembly at any desired location within a vehicle interior.

As specifically shown in FIG. 4, the parking brake 74P is in a non-engaged or at-rest position, while the footrest assembly 10 is in a deployed position B. As shown in FIG. 4, there is sufficient room for the footrest assembly 10 to be in the deployed position B, such that the top plate 12 does not interfere with other components in the vehicle interior 60. As shown in FIG. 5, the parking brake pedal 74P has moved from the non-engaged position to an engaged position along an actuation path indicated by arrow J. In FIG. 5, the footrest assembly 10 is in a stowed position A and the parking brake assembly 74P is able to move to the fully engaged position without interference from the footrest assembly 10 while the footrest assembly 10 is in the stowed position A. Thus, the footrest assembly 10 of the present invention provides for a deployable and stowable footrest assembly 10 that makes it possible to provide a footrest assembly in a constrained vehicle interior.

Figure 6:
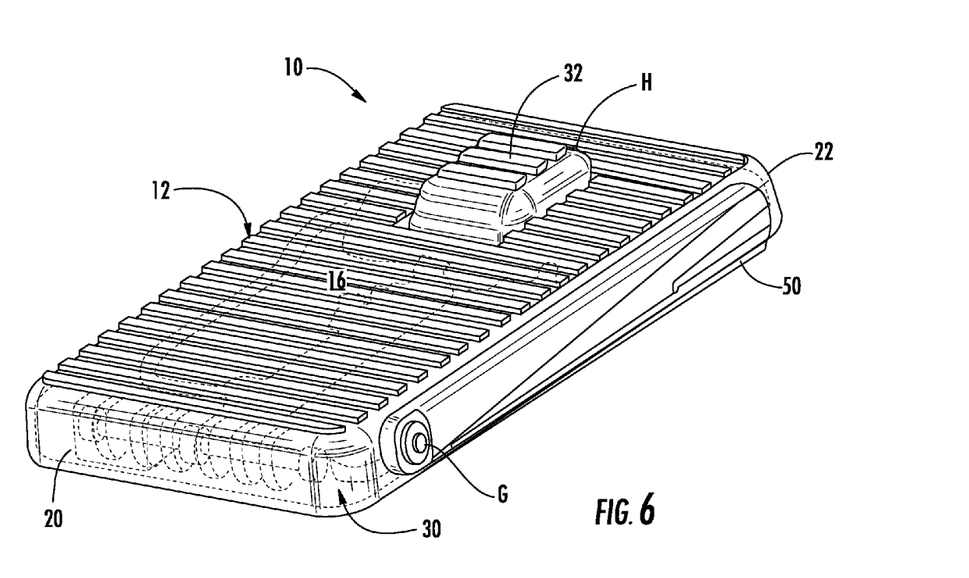
FIG. 6 is a rear perspective view of the footrest assembly of FIG. 1A.
Figure 7:
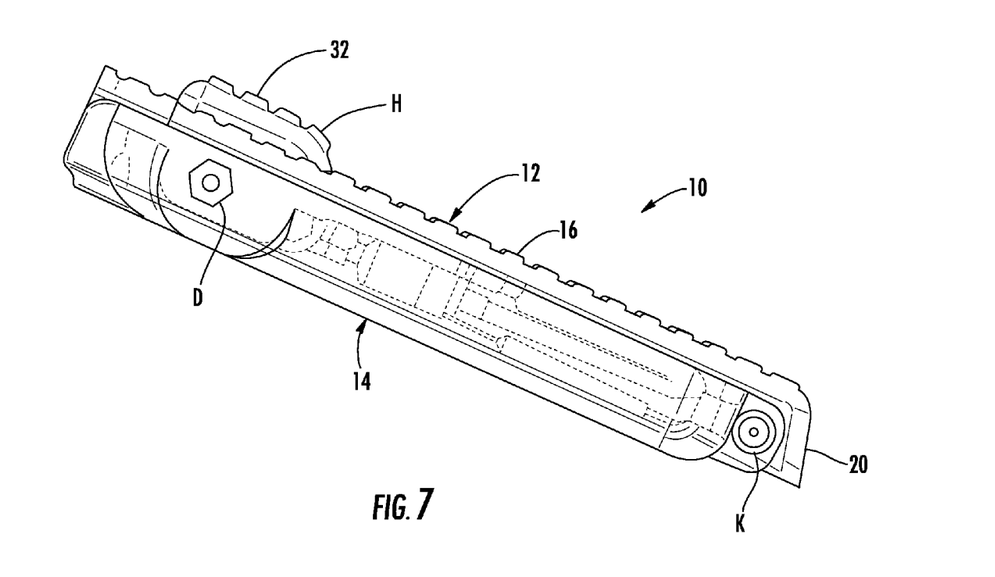
FIG. 7 is a side elevational view of the footrest assembly of FIG. 1A.

Referring now to FIGS. 6 and 7, the footrest assembly 10 is shown in a stowed position A with the actuation button 32 in an at-rest position H such that the actuation button 32 is disposed above the upper surface 16 of the top plate 12. In this way, the actuation button 32 can be depressed by the vehicle occupant to an engaged position I shown in FIG. 10A. As shown in FIGS. 6 and 7, the footrest assembly 10 is a modular footrest assembly, wherein the componentry used to deploy the footrest assembly 10 is housed within the cavity 30 defined by the housing 14. As shown in FIG. 7, the top plate 12 is pivotally coupled to the housing 14 at pivot point K as further described below.

Figure 8:
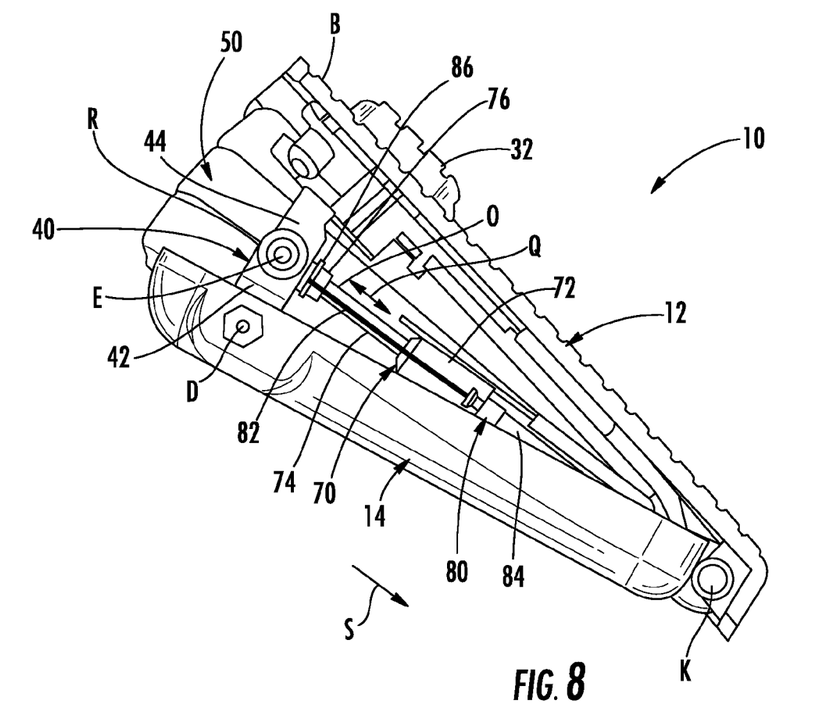
FIG. 8 is a side elevational view of the footrest assembly of FIG. 1B.
Figure 9:
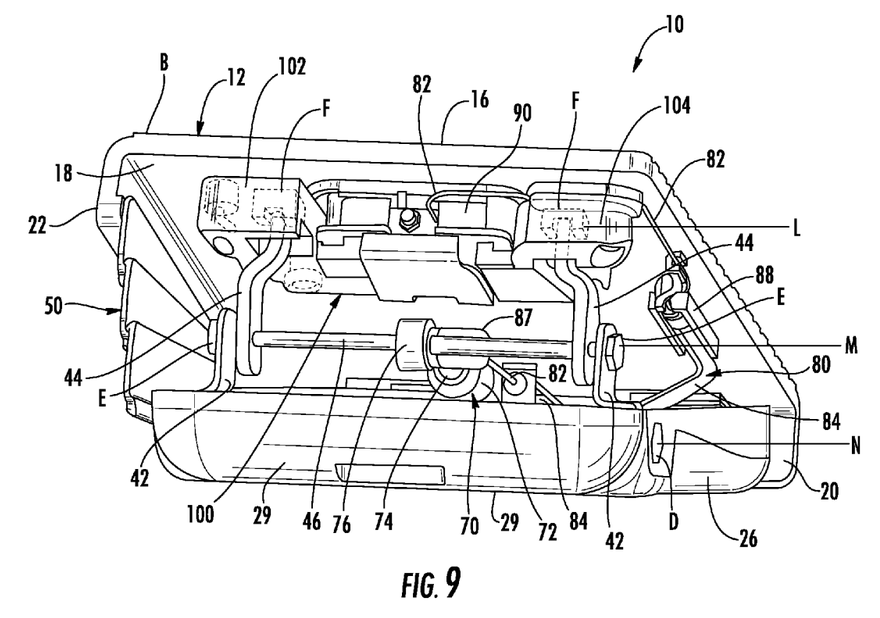
FIG. 9 is a front perspective view of a footrest assembly in a deployed position.

Referring now to FIGS. 8 and 9, the footrest assembly 10 is shown having a deployment mechanism or actuator 70 and a stowage mechanism 80. In FIG. 8, the actuator 70 is in the form of a gas spring 72 having a piston 74 that is moveable between extended and retracted positions O, P along a path as indicated by arrow Q. In FIG. 8, the piston 74 is in the extended position O as powered by the gas spring 72, such that the piston 74 has pushed the linkage assembly 40 to an upright and locked position R at a set locking threshold angle. Thus, the footrest assembly 10 of the present invention can sit flush and parallel to a carpet surface in the stowed position A, and then be deployed to the deployed position B where the top plate 12 rotates at pivot point K relative to the housing 14 to a predetermined angle providing a vehicle occupant with a robust and firm footrest. The robustness and firmness of the footrest assembly 10 is provided by the mechanical linkage of the linkage assembly 40 that is in a locked position R as further supported by consistent pressure on the deployment mechanism 70. Thus, in this way, the deployment mechanism 70 provides in-line tension to the linkage assembly 40 to keep the linkage assembly 40 in the locked position R by urging the piston 74 to the extended position O as coupled to the pivot support rod 46 shown in FIG. 9. The piston 74 is coupled to the support pivot 46 via a pivotal mounting member 76 as shown in FIG. 9. In this way, the actuator 70 is pivotally coupled to the pivot support rod 46 such that the actuator 70 can move with the top plate 12 between stowed and deployed positions A, B. Further, it is contemplated that electronic means of deployment could also be utilized with the present invention, such as a solenoid mechanism replacing the gas spring deployment mechanism 70. Using a solenoid mechanism, an electronic means for triggering the solenoid mechanism can be incorporated into the footrest assembly 10 without departing from the spirit of the present invention. Further, the gas spring deployment mechanism 70 could be replaced with a tension spring, a torsion spring or a clock spring as a method of deploying the top plate 12, wherein such a spring mechanism includes an associated trigger mechanism adapted to activate the spring mechanism.

The stowage mechanism 80 is shown in FIG. 8 as having a portion thereof running generally parallel with the actuator mechanism 70. In the embodiment of FIG. 8, the stowage mechanism 80 comprises a cable 82 coupled to a bracket 86 at a first end of the cable 82. The bracket 86 is disposed on the pivotal connecting member 76 to which the piston 74 of the actuator 70 is also connected. As best shown in FIG. 9, the cable 82 is routed through a housing 84 which is coupled to the underside 18 of the top plate 12 at a housing coupling 88. The cable 82 is further routed to a latch mechanism 90 where the cable 82 is coupled thereto at a second end. In operation, the stowage mechanism 80 is adapted to break or release the linkage assembly 40 from the locked position R towards a stowed or collapsed position by pulling the pivot support rod 46 in a direction as indicated by arrow S. The stowage motion of the top plate 12, as powered by the vehicle occupant, compresses the gas spring 72 approximately 2 mm to 5 mm which breaks the locked condition of the linkage assembly 40 thereby enabling the vehicle occupant to stow the top plate 12. The breaking of the linkage assembly 40 is similar to the breaking of a linkage as found on a folding card table. The cable 82 provides this pulling action to break the locked condition of the linkage assembly 40 when the latch mechanism 90 is retracted by actuator button 32 as further described below. Further, it is contemplated that when an electronic solenoid mechanism is used as a means of deployment for the footrest assembly 10, the solenoid can also be used as a stowage mechanism to break the lock position of the linkage assembly 40 by electronically retracting the solenoid, thereby moving the linkage assembly 40 towards the stowed position. Other like mechanisms can be incorporated into the present invention without departing from the spirit of the present invention, such as various drive mechanisms or rigid connectors that can both deploy the top plate 12 of the footrest assembly 10 and release the linkage assembly 40 from the locked condition to initiate the stowing of the top plate 12.

As shown in FIG. 9, a support gibb 100 is coupled to the underside 18 of top plate 12. The support gibb 100 includes a generally U-shaped body portion having side members 102 and 104 which are generally disposed on either side of the actuation button 32 and latch mechanism 90. The side members 102, 104 provide for the pivotal connection points F for attaching the upper arms 44 to the top plate 12. Thus, in assembly, the linkage assembly 40 three horizontal planes of shear L, M and N indicated at pivot points D, E and F. Shear plane L is disposed at and defined by the pivotal connection F between upper arm 44 and the support gibb side members 102, 104. Shear plane M is located at and defined by the pivotal connection E between upper and lower links 44, 42. Shear plane N is located at and defined by the pivotal connection D between the lower links 42 and the housing 14. Thus, as opposed to a dual set of rigid singular supporting arms, the design of the present invention incorporates a multi-link linkage assembly 40 to support the top plate 12 in the deployed position B. In an event, causing a mechanical overload, forces realized on the top plate 12 would cause the top plate 12 to collapse and the supporting links 42, 44 would fold away as further described below with reference to FIG. 11.

Figure 10:
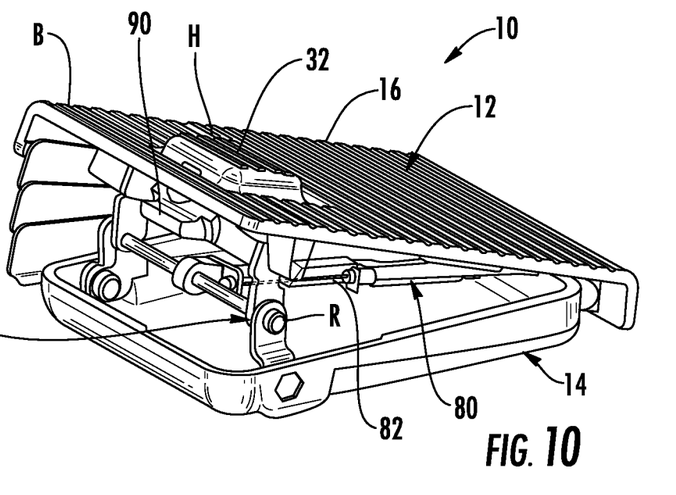
FIG. 10 is a front perspective view of a footrest assembly having an actuation button in an at-rest position.
Figure 10A:
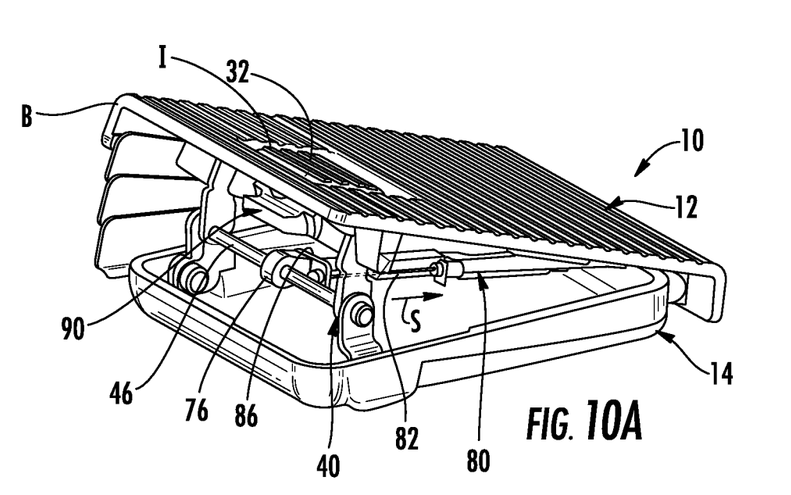
FIG. 10A is a front perspective view of the footrest assembly of FIG. 10 having the actuation button in an engaged position.

Referring now to FIGS. 10 and 10A, the actuation button 32 is shown in an at-rest position H and in an engaged or actuated position I respectively. In FIG. 10, in the at-rest position H, the actuation button 32 is disposed above the upper surface 16 of the top plate 12. In this position, the linkage assembly 40 is supported by the deployment mechanism 70 and is set at a fixed position or locked condition R. As shown in FIG. 10, the actuator button 32 is a readily available target positioned at an upper or car-forward location on the top plate 12. In this way, the actuator button 32 is in a location that is not too difficult to actuate or deploy the footrest assembly 10, and is also placed in a position where unintentional deployment is easily avoided. As the actuation button 32 is depressed by the vehicle occupant from the at-rest position H to the engaged position I, as shown in FIG. 10A, the latch mechanism 90 retracts from a latched position, shown in FIG. 10, to an unlatched position, shown in FIG. 10A. As the latch mechanism 90 retracts, the cable 82 pulls the linkage assembly 40 a pivot support rod 46 in a direction as indicated by arrow S to break the linkage assembly 40 from the locked condition R to a stowable condition. Once the cable 82 has pulled the linkage assembly 40 beyond a locking threshold angle, as shown in the locked condition R, the top plate 12 is able to collapse to the stowed position A, as shown in FIG. 1A. By actuating the actuation button 32, the vehicle occupant also compresses the deployment mechanism 70 such that the piston 74, as shown in FIG. 9, retracts into the gas spring 72. For either stowage or deployment of the footrest assembly 10, the vehicle occupant utilizes the same manual trigger, shown in FIGS. 10 and 10A as actuation button 32. The actuation button 32 rotates along with the top plate 12 and the latch assembly 90 between the stowed and deployed positions A, B of top plate 12. Further, it is contemplated that when electronic means of deployment are incorporated into the footrest assembly 10, the actuation button 32 may be an actuation trigger in the form of an electronic switch or other like manual trigger capable of initiating both stowing and deployment the footrest assembly 10. Other like actuation triggers may include purely electronic actuation triggers, such as an electronic switch or a voice activated command processed through a vehicle controller adapted to control the footrest assembly 10.

Figure 11:
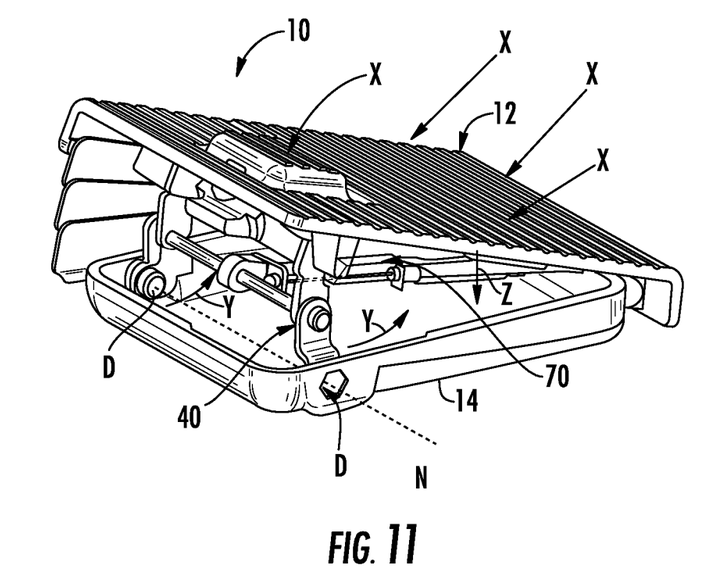
FIG. 11 is a front perspective view of a footrest assembly having an actuation button in an at-rest position indicating relative movement during a collision event.

Referring now to FIG. 11, mechanical overload forces, indicated by arrows X, are shown being realized on the top plate 12 of the footrest assembly 10. The mechanical overload forces X are generally indicated in a car-forward and downward direction on the top plate 12. Further, the forces X realized during an event causing a mechanical overload are much greater than the general force applied by the vehicle occupant when the footrest assembly 10 is in normal use. The load applied by the vehicle occupant may cause the linkage assembly 40 to go into a collapse mode and collapse due to shearing at one of the horizontal shear planes L, M or N, thereby moving the linkage assembly 40 in a direction as indicated by arrows Y. The top plate 12 will experience a car-forward movement as indicated by mechanical overload forces X as well as a downward movement indicated by arrow Z as the linkage assembly 40 collapses. In the embodiment shown in FIG. 11, the linkage assembly 40 has experienced shear along shear plane N which is at pivot point D between the housing and the linkage assembly 40. The deployment mechanism 70 is in a parallel relation to the top plate 12 and the mechanical overload forces X realized on the footrest assembly 10. In this way, the in-line deployment mechanism 70 does not provide for any undue interference in the collapsing of the top plate 12 during mechanical overload. The deployment mechanism 70 being linearly aligned with the top plate 12 within the footrest assembly 10 provides an advantage over other adjustable footrest assemblies, where a deployment mechanism generally rigidly retains the footrest in a deployed condition, rather than providing opportunity to collapse.

The use of the rising linkage arms 42, 44 of the linkage assembly 40 provides an opportunity for collapsibility of the deployable footrest assembly 10 during mechanical overload. As such, shear plane N, shown in FIG. 16, can have shear bolt 43 where the lower links 42 pivotally couple to the housing 14 and thereby provide a shear mechanism to enable the top plate 12 to move forward during mechanical overload as indicated in FIG. 11. The shear bolt or shear pins 43 can also be disposed at pivot locations E and F to provide multiple planes of shear, such as planes L, M, and N shown in FIG. 9. In operation, the shear bolts provide a collapsible opportunity, wherein the bolts or pins are designed to shear in the case of mechanical overload. In this way, the deployable footrest assembly may not resist the force applied by a vehicle occupant during a mechanical overload event.

Figure 12:
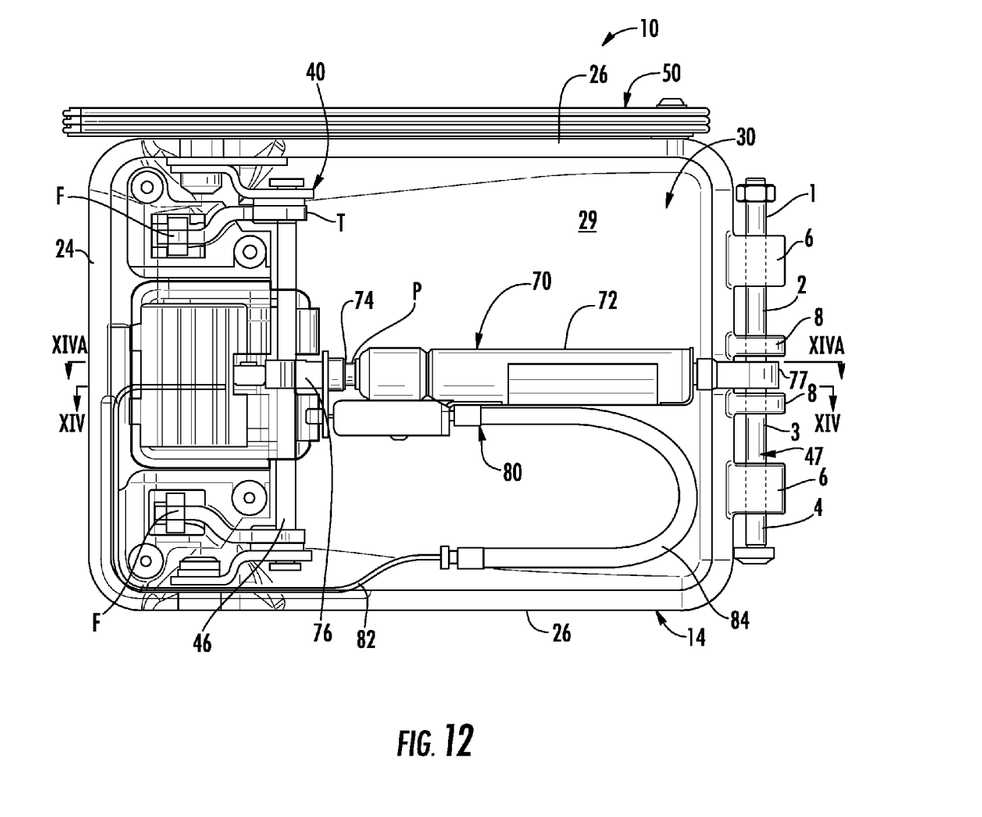
FIG. 12 is a top plan view of a footrest assembly having a top plate removed.

Referring now to FIG. 12, the footrest assembly 10 is shown with the top plate 12 removed to reveal the actuation componentry of the footrest assembly 10 disposed within the cavity or interior portion 30 of the housing 14. In the embodiment shown in FIG. 12, the linkage assembly 40 is in a collapsed position T. As further shown in FIG. 12, the deployment mechanism 70 is pivotally coupled to a front pivot support rod 46 via pivotal mounting member 76 at a front end of the deployment mechanism 70, and coupled to a rear pivot support rod 47 at pivotal mounting member 77 at a rearward end. The housing 14 is also coupled to the rearward support pivot rod 47 at outer connecting members 6 and inner connecting members 8. As shown in FIG. 12, inner connecting members 8 are disposed on opposite sides of pivotal mounting member 77. Spaces 1, 2, 3 and 4 are located on the rear pivot support rod 47 and serve as coupling locations to pivotally couple the top plate 12 to the housing 14.

As shown in FIG. 12, the deployment mechanism 70 is attached to the pivot support rod 46 rather than to the supporting links 42, 44 of the linkage assembly 40. In this way, the deployment mechanism 70 is situated parallel to the vehicle occupant's foot as positioned on the top plate 12. Thus, the force of actuation of the footrest assembly 10 travels away from the vehicle occupant such that, during mechanical overload, the deployment mechanism 70 would not add additional force or resistance against the vehicle occupant's foot when a load is realized on the footrest assembly 10 by the vehicle occupant's foot. Rather, the deployment mechanism 70 would simply collapse due to the horizontal planes of shear provided in the linkage assembly 40 to collapse the linkage assembly 40 to the collapsed position T.

Figure 13:
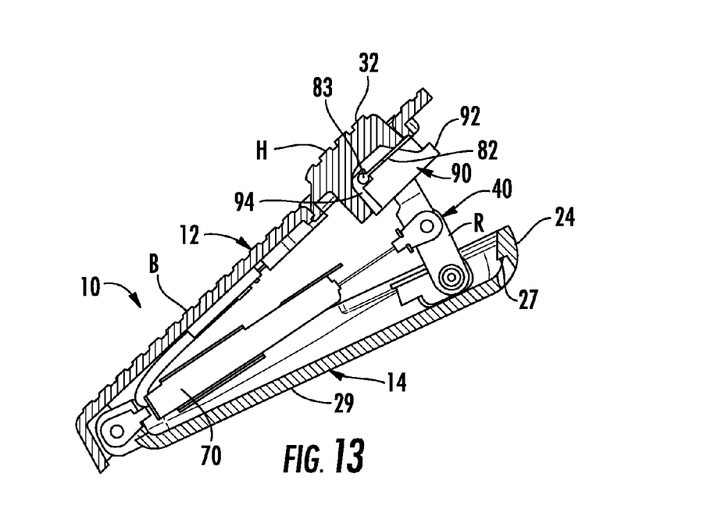
FIG. 13 is a cross-sectional view of a footrest assembly in a deployed position.

Referring now to FIG. 13, the footrest assembly 10 is shown in a deployed position B having the linkage assembly 40 in a locked position R. As further shown in FIG. 13, the latch mechanism 90 includes a latch pawl 92 disposed at a car-forward position and a cavity 94 disposed at a car-rearward position, wherein the cavity 94 positively engages a bead member 83 of cable 82. In this way, cable 82 is coupled to the latch mechanism and is adapted to move between latched and unlatched positions of the latch mechanism 90 thereby imparting a pulling force on the linkage assembly 40 to which cable 82 is also coupled.

Figure 14:
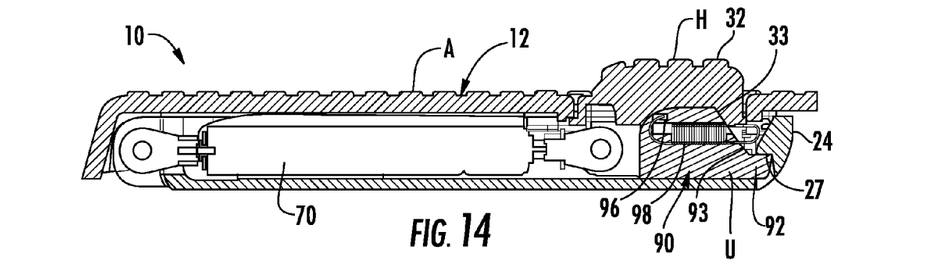
FIG. 14 is a cross-sectional view of the footrest assembly of FIG. 12 taken at line XIV showing a latch mechanism in a latched position.
Figure 14A:
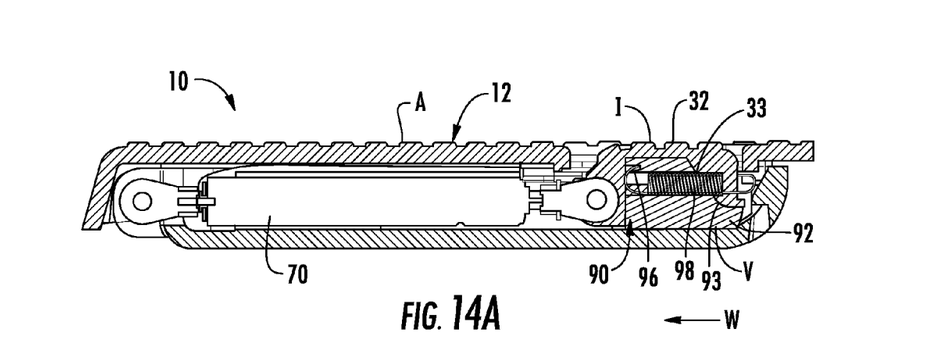
FIG. 14A is a cross-sectional view of the footrest assembly of FIG. 12 taken at line XIVA showing the latch mechanism in an unlatched position.
Figure 15:
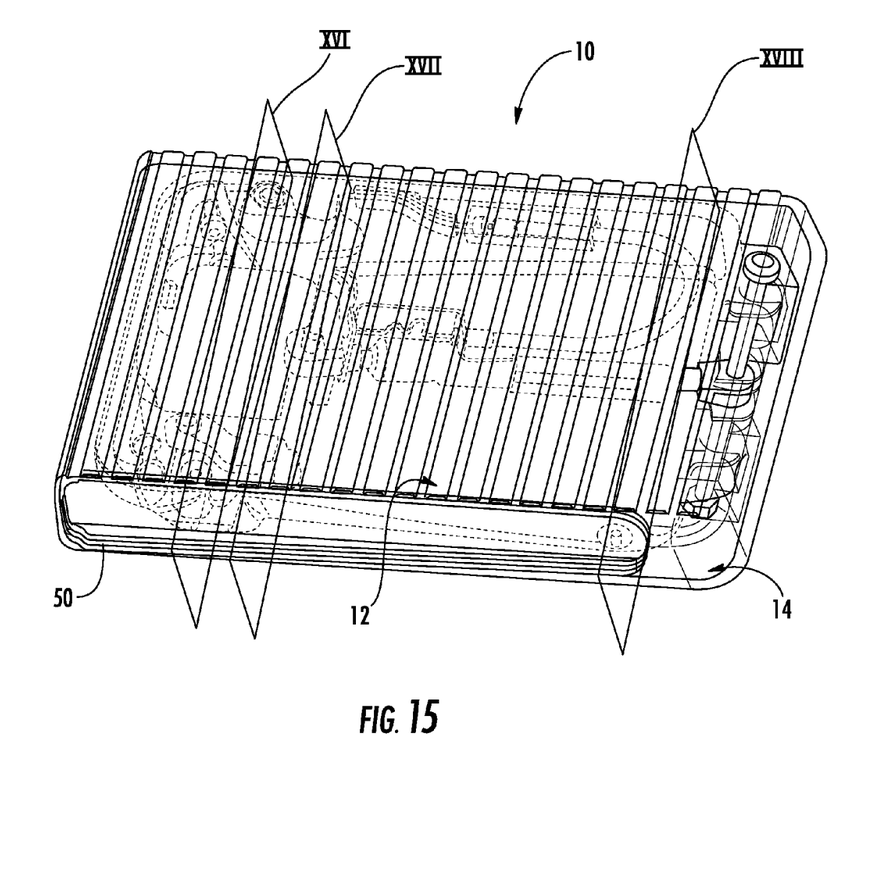
FIG. 15 is a top perspective view of a footrest assembly in a stowed position.

As shown in FIG. 14, the latch mechanism 90 is shown in a latched position U as compared to an unlatched position V shown in FIG. 14A. The latch mechanism 90 is adapted to move between the latched position U and the unlatched position V in a direction as indicated by arrow W by the actuation of actuation button 32 to the engaged position I. The downward movement of the actuation button 32 causes lateral movement of the latch mechanism 90 in the direction as indicated by arrow W due to an angled surface 33 disposed on the actuation button 32 that is matingly and slideably engaged with an angled surface 93 of the latch mechanism 90. Thus, as the actuator button 32 is depressed by a vehicle occupant to the engaged position I, the latch mechanism 90 is urged in a car-rearward direction to the unlatched position V, such that latch pawl 92 is moved out of engagement with a latch striker 27 disposed on the front wall 24 of the housing 14. When in the unlatched position V, the top plate 12 is free to move to the deployed or stowed condition. As shown in FIGS. 14 and 14A, the latch mechanism 90 is further coupled to a return spring 98 at a catch member 96 disposed on the latch mechanism 90, wherein the spring is further coupled to the top plate 12 at an opposite end such that the latch mechanism 90 is biased towards the engaged position U as shown in FIG. 14. Thus, the biasing spring 98 ensures that the at-rest position for the latch mechanism 90 is the latched condition U. As the latch condition U is in a car-forward direction, the angled surface 93 of the latch mechanism 90 will slideably engage the angled surface 33 of the actuator button 32 thereby moving the actuator button 32 upwards towards the at-rest position H when the actuator button 32 is released from engagement by the vehicle occupant. When in the latched position U, the latch mechanism 90 engages the latch striker 27 of the housing 14 at latch pawl 92 such that the top plate 12 is clipped in to place in the stowed position A. This clipping effect also provides the vehicle occupant with a tactile indication that the top plate 12 has been adequately engaged with the housing 14 to retain the top plate 12 in the stowed position A.

Figure 16:
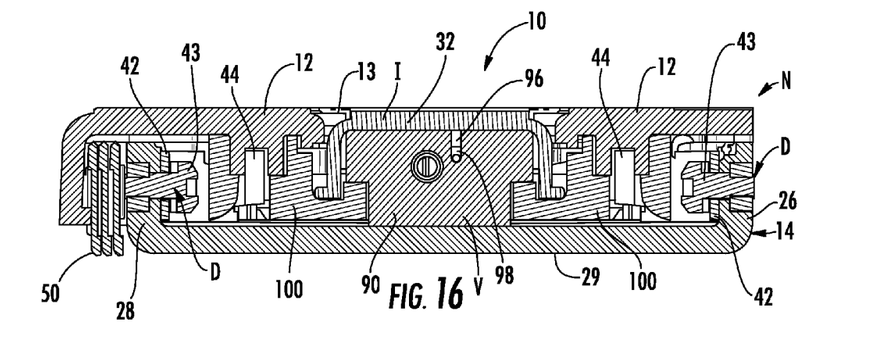
FIG. 16 is a cross-sectional view of the footrest assembly of FIG. 15 taken at line XVI.

Referring now to FIGS. 15-18, the footrest assembly 10 is shown in the stowed position A. As shown in FIG. 16, taken at line XVI of FIG. 15, the actuation button 32 is in the engaged position I such that latch mechanism 90 is in the unlatched position V. The actuator button 32 is disposed in an aperture 13 which is disposed on the top plate 12. The cross-sectional view of FIG. 16 shows the pivotal connection D of lower link 42 to the side walls 28, 26 of the housing 14 via fasteners 43. The cross-sectional view of FIG. 16 further represents the horizontal plane of shear N (FIG. 9) located at pivotal connection point D.

Figure 17:
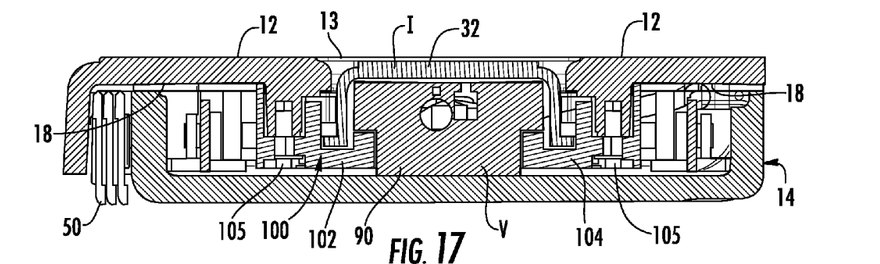
FIG. 17 is a cross-sectional view of the footrest assembly of FIG. 15 taken at line XVII.

Referring now to FIG. 17, the gibb support member 100 is coupled to the top plate 12 using fasteners 105 which are connected through side members 102, 104 of the gibb 100. In this way, the gibb 100 attaches to the underside 18 of the top plate 12. Fasteners 105 could be shear pins or shear fasteners providing for a shearing effect at shear plane L (FIG. 9).

Figure 18:
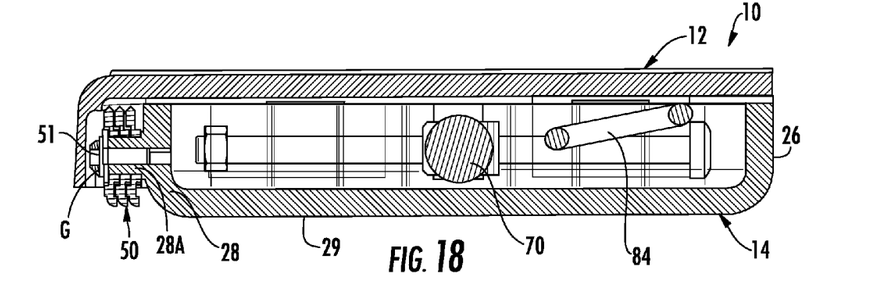
FIG. 18 is a cross-sectional view of the footrest assembly of FIG. 15 taken at line XVIII.

Referring now to FIG. 18, the cross-sectional view of the footrest assembly 10 depicted shows an engagement flange 28A disposed on side wall 28 of the housing 14 which is adapted to receive a fastener 51 thereby coupling the side closeout mechanism 50 in a pivotal manner at pivotal connection G to the housing 14.

As noted above, the footrest assembly 10 of the present invention is a modular footrest assembly which makes the unit easy to install in a carryover vehicle program or to be included in an end-assembly manufacturing process. The modularity of the footrest assembly 10 also has retrofit and cross-program applications not found in other known footrest assemblies. The footrest assembly 10 of the present invention could be heat stacked to meld or engage a carpet assembly as a part-in-assembly install device. Further, the footrest assembly 10 could be brought into the manufacturing plant as an end-item, wherein the footrest assembly 10 would be attached to a vehicle floorboard via a base plate receiver type application. A retrofit application into an existing vehicle allows for the footrest assembly 10 of the present invention to be installed via dealership or by the customer, giving the footrest assembly 10 great potential in the aftermarket field. The general package requirements for the footrest assembly 10 are minimal as it is primarily constrained by the required floor area flatness under the footprint of the housing portion 14. For instance, a carpet trim may include a pocket for receiving the footrest assembly 10, such that the top plate 12 would be flush with an A-side of the carpet trim when the footrest assembly 10 is in a stowed condition A (FIG. 1A). Thus, the modularity of the footrest assembly 10 allows for cross-vehicle platform integration, assembly plant installation as a part-in-assembly or end item assembly install item, and aftermarket opportunities where the modular footrest assembly 10 can be sold at a standalone unit to be installed by dealers and customers alike.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability necessary for proper function for the present innovations. Accordingly, all such modifications are intended to be included within the scope of the present innovations. Other substitutions, modifications, changes, and omissions may be made in the design, operating conditions, and arrangement of the desired embodiment and other exemplary embodiments without departing from the spirit of the present innovations.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A footrest assembly, comprising:
    a top plate pivotally coupled to a housing between deployed and stowed positions;
    an actuator operably coupled to the top plate and adapted to move the top plate to the deployed position when activated by a trigger mechanism and
    a linkage assembly adapted to support the top plate in the deployed position, the linkage assembly adapted to collapse under a crash force applied during a collision event, wherein the linkage assembly includes one or more links pivotally coupled to the top plate at a first end and pivotally coupled to the housing at a second end.

2. The footrest assembly of claim 1, wherein:
    the linkage assembly includes a set of upper links and a set of lower links, wherein the upper links are pivotally coupled to the top plate at an upper pivot point and further coupled to the lower links at an intermediate pivot point; and
    wherein the lower links are pivotally coupled to the housing at a lower pivot point.

3. The footrest assembly of claim 2, wherein:
    a shear plane is defined at one of the upper pivot point, the intermediate pivot point and the lower pivot point.

4. The footrest assembly of claim 1, including:
    a latch mechanism operably coupled to the trigger mechanism, the latch mechanism operable between latched and unlatched positions; and
    wherein the latch mechanism is adapted to retain the top plate in the stowed position when the latch mechanism is in the latched position.

5. The footrest assembly of claim 4, wherein:
the trigger mechanism comprises an actuator button operable between at-rest and engaged positions, and further wherein the actuator button is adapted to urge the latch mechanism to the unlatched position as the actuator button moves to the engaged position.

6. The footrest assembly of claim 5, including:
a biasing mechanism coupled to the latch mechanism and the top plate, the biasing mechanism adapted to bias the latch mechanism to the latched position.

7. The footrest assembly of claim 4, including:
a stowage mechanism having a cable, the cable coupled to the linkage assembly at a first end and further coupled to the latch mechanism at a second end; and
wherein the stowage mechanism is adapted to move the linkage assembly from a locked condition towards a collapsed condition as the latch mechanism is moved to the unlatched position.

8. A footrest assembly, comprising:
a top plate moveable between deployed and stowed positions relative to a housing;
a latch mechanism disposed on the top plate, and adapted to retain the top plate in the stowed position when the latch mechanism is in a latched position;
an actuator operably coupled to and linearly aligned with the top plate, biasing the top plate to the deployed position when the latch mechanism is in an unlatched position;
a linkage assembly disposed between and operably coupled to the top plate and the housing, the linkage assembly operably between an extended position and a collapsed position, wherein the linkage assembly is adapted to support the top plate in the deployed position when the linkage assembly is in the extended position, wherein the linkage assembly is in a locked condition in the extended position; and
a stowage mechanism having a cable, the cable coupled to the latch mechanism at a first end and further coupled to the linkage assembly at a second end, wherein the stowage mechanism is adapted to release the linkage assembly from the locked condition as the latch mechanism is moved to the unlatched position.

9. The footrest assembly of claim 8, including:
one or more planes of shear defined on the linkage assembly.

10. The footrest assembly of claim 9, wherein:
the linkage assembly is adapted to collapse under mechanical overload due to shearing at one of the one or more planes of shear defined on the linkage assembly.

11. The footrest assembly of claim 10, wherein:
the actuator defines a deployment mechanism that does not impart resistance as the top plate moves forward and collapses under the crash force.

12. The footrest assembly of claim 11, wherein:
the footrest assembly is a modular unit.

13. A footrest assembly, comprising:
a top plate operable between deployed and stowed positions;
a linkage assembly adapted to support the top plate in the deployed position;
an actuation trigger disposed on the top plate and coupled to a latch mechanism for latching the top plate in the stowed position, wherein the latch mechanism is operable between latched and unlatched positions, wherein the latch mechanism is adapted to engage a housing coupled to the top plate to retain the top plate in the stowed position when the latch mechanism is in the latched position; and
a stowage mechanism coupled to the latch mechanism and adapted to move the linkage assembly from a locked condition towards a collapsed condition, wherein the stowage mechanism includes a cable coupled to the latch mechanism at a first end and coupled to the linkage assembly at a second end, the cable adapted to move the linkage assembly from the locked condition towards the collapsed condition as the latch mechanism moves to the unlatched position.

14. The footrest assembly of claim 13, wherein:
the linkage assembly includes a collapse made, wherein the linkage assembly is adapted to collapse under mechanism overload.

15. The footrest assembly of claim 14, wherein:
the footrest assembly is a modular unit.

* * * * *